Feb. 1, 1927.
P. C. DAY
POWER TRANSMISSION MECHANISM
Filed Nov. 6, 1922
1,616,415
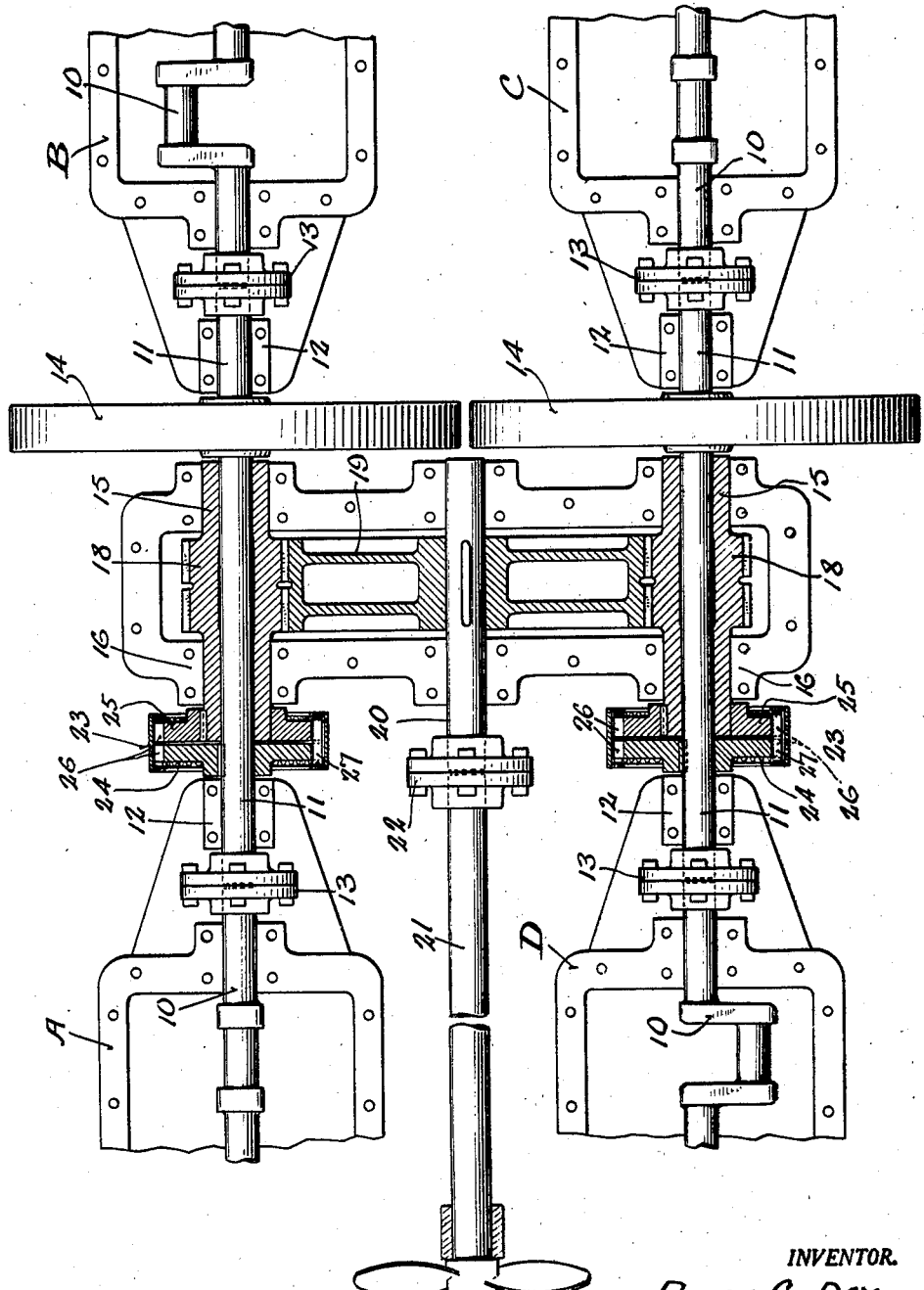
INVENTOR.
PERCY C. DAY
BY
*Ralph W. Brown*
ATTORNEY.

Patented Feb. 1, 1927.

1,616,415

UNITED STATES PATENT OFFICE.

PERCY C. DAY, OF MILWAUKEE, WISCONSIN, ASSIGNOR TO THE FALK CORPORATION, OF MILWAUKEE, WISCONSIN, A CORPORATION OF WISCONSIN.

POWER-TRANSMISSION MECHANISM.

Application filed November 6, 1922. Serial No. 599,422.

This invention relates to power transmission mechanism for use, primarily, in intergeared, multiple engine power plants.

One object of the present invention is the provision of a transmission mechanism which will insure operation of the engines in proper phase relation and, at the same time, permit such flexibility between the intermeshing gears as may be required to maintain a smooth gear action.

Other objects and advantages will appear from the following description of an illustrative embodiment of this invention.

The single figure of the drawing is a diagrammatic plan view of a power transmission mechanism, constructed in accordance with the present invention, and illustrated as a part of a marine power plant involving four internal combustion engines.

The form and construction of the four engines A, B, C and D are immaterial to the present invention and need not be described. They are arranged in pairs, the engines A and B of one pair being so arranged that their crank shafts 10 are substantially in alignment and the engines C and D constituting the second pair being similarly arranged and parallel to the first pair. The crank shafts of each pair are rigidly connected for rotation in unison by a shaft 11, journaled in fixed bearings 12, and secured to the crank shafts through appropriate couplings 13. A fly-wheel 14 is keyed or otherwise secured to each shaft 11 for smoothing out the characteristic power impulses received from the engines.

Each shaft 11 passes loosely through a hollow pinion shaft 15, journaled in fixed bearings 16 provided in a gear casing 17. Each pinion shaft 16 carries and drives a pinion 18, preferably of the herringbone type, the pinions 18 being disposed on opposite sides of and meshing with a gear 19, of a similar type, keyed or otherwise fixed to a shaft 20 journaled in the gear casing. Shaft 20 is connected in driving relation with the propeller shaft 21 through an appropriate coupling 22.

Each shaft 11 is connected in driving relation with the corresponding pinion shaft 15, preferably through a flexible coupling 23. In this instance, each of these couplings comprises a pair of coupling discs 24 and 25, keyed, respectively, to the shaft 11 and pinion shaft 15, and provided with a peripheral series of teeth 26. The teeth of the respective coupling discs are connected by a resilient grid 27 constituting a strip of spring metal threaded back and forth between the teeth. These couplings are well known in the art and need not be further described.

Thus, it will be noted that a rigid connection is established between the crank shafts of the engines of each pair so that they are constrained to operate in definite phase relation. At the same time, the flexibility of each coupling 23 between each shaft 11 and the corresponding pinion shaft 16 not only permits sufficient play to take care of slight misalignments between these shafts but also permits sufficient lengthwise shifting of the pinion shaft to allow pinion 18 to adjust itself to gear 19. A smooth action between the pinions and gear is thus assured.

The fly-wheels 14 are preferably disposed at that side of the gear casing 17 opposite the propeller shaft 21 so as to permit the use of fly-wheels of maximum diameter.

Various changes may be made in the embodiment of the invention hereinabove described, without departing from or sacrificing any of the advantages of the invention as defined in the appended claim.

I claim:

A power plant comprising a driven gear, a shaft driven thereby and extending beyond one side thereof, means including a pair of driving gears for driving said driven gear, a drive shaft extending through each driving gear, a fly-wheel on each driving shaft and disposed on the other side of said driven gear, an internal combustion engine at each end of each drive shaft having a crank shaft connected therewith, and a coupling between each drive shaft and the corresponding driven gear.

In witness whereof, I hereunto subscribe my name this 27th day of October, 1922.

PERCY C. DAY.